UNITED STATES PATENT OFFICE.

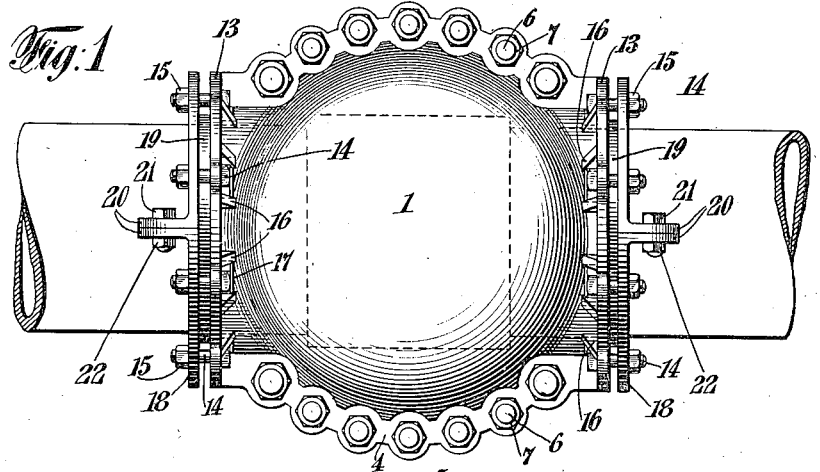
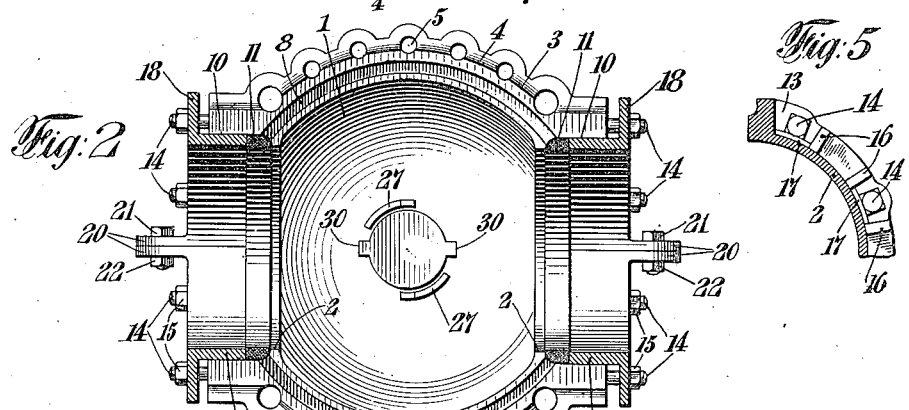
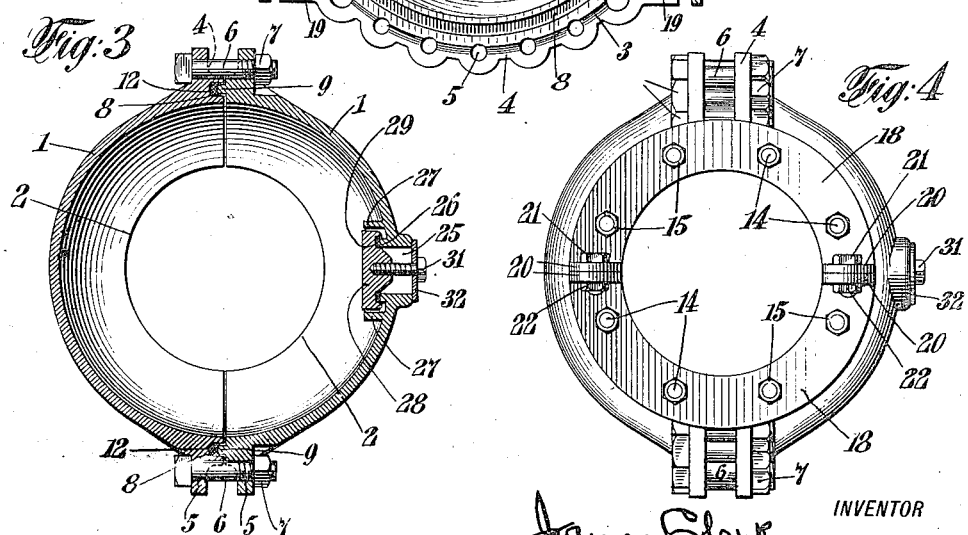

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

REPAIR DEVICE FOR PIPE-LINES.

1,165,388.   Specification of Letters Patent.   Patented Dec. 28, 1915.

Application filed June 17, 1915. Serial No. 34,575.

*To all whom it may concern:*

Be it known that I, JAMES CLARK, a citizen of the United States, residing at Bradford, in the county of McKean and State of Pennsylvania, have invented certain new and useful Improvements in Repair Devices for Pipe-Lines; and I do hereby declare the following to be a full, clear, and exact description of the invention, such as will enable others skilled in the art to which it appertains to make and use the same.

My invention consists in the novel features hereinafter described reference being had to the accompanying drawing which illustrates one embodiment of my invention selected by me for the purpose of illustrating the invention and said invention is fully disclosed in the following description and claims.

Referring to the said drawing: Figure 1 represents an elevation of a repair device embodying my invention applied to a pipe line over a leaky coupling therein. Fig. 2 represents an elevation of one half section of the spherical split sleeve shown in Fig. 1, the end packings and followers being illustrated in section. Fig. 3 represents a transverse sectional view through the spherical split sleeve. Fig. 4 is an end elevation of the repair device shown in Fig. 1.

My invention relates to what are known in the art as repair devices or split sleeves which are usually employed for the purpose of repairing a leak in a pipe line already laid, either adjacent to a coupling therein or between couplings and which are applied to the pipe line without the necessity of cutting off the flow of material through the pipe line or of disturbing the pipe sections adjacent to the leak. These devices are customarily made in sections, separated longitudinally, and usually in two sections, so that they may be placed around the pipe and around the coupling if the leak occurs at a coupling as it very frequently does. The sections of the split sleeve are bolted together upon interposed packing strips and the sleeves are provided at each end with packing recesses to receive annular packings or packing rings which are forced in tightly against the exterior surface of the pipe by followers so as to make a tight joint and prevent the leakage of material, gas, oil, or other material, from the defective portion of the pipe or coupling. In the use of repair devices of this kind they are subjected to very high pressures in many cases, especially when used in high pressure gas lines where the pressures carried may be as high as 500 lbs. per square inch and in some cases higher. These repair devices or split sleeves are, therefore, subjected to very severe strains by reason of such internal pressures and they are also subjected to great strains by reason of the bolts or clamping devices employed to connect the meeting edges or faces of the split sleeve sections and clamp them on the interposed packing strips which strains are increased by changes in temperature which affects both the repair device and the material within the line. These split sleeves have usually been made of substantially oblong or analogous form and have usually been made of cast iron and as the packing engaging portions of the opposed edges of the split sleeve sections were of irregular shape it has not been practical to provide accurately machined surfaces to engage the packing strips and ordinarily, wide packing strips, or strips providing sufficient material to compensate for the irregularities of the meeting surfaces have been required in order to secure a tight joint along the edges of the sleeve sections. It has not been practical to use cast steel in the manufacture of these split sleeves commercially, as the steel castings have a much rougher surface than iron castings and owing to the form of the split sleeves and the packing engaging portions thereof, it has been difficult and expensive, if not wholly impracticable to obtain sufficiently smooth meeting surfaces to secure tight joints.

According to my invention, I form a central portion of the split sleeve substantially spherical and divide it, preferably, into two sections having opposing flanges at their outer edges, the inner faces of which will be in true curves substantially concentric with the spherical portion of the sleeve, the center of which will be practically at a central point in the longitudinal axis of the sleeve. The spherical form of the sleeve body provides for the greatest possible strength with a given thickness for the resistance of internal pressures and also provides for the greatest strength at the junction between the edges of the sections and their lateral flanges, which will be true segments of a circle concentric with the center of the spherical portion. Further than this and by reason of this structure it is easily possible to provide reduced packing engaging portions which shall be in a true curve concentric with the center of the spherical portion and which being in true curve form may be readily machined on a lathe or other suitable tool, which may also be employed to machine the entire meeting faces of the split sleeve sections, if desired, thus enabling the parts to be accurately fitted so as to equalize the bolt strain on the flanges and also to obtain a tight joint with a much smaller quantity of packing than is possible under other conditions, and my invention also makes it possible to utilize commercially steel castings in forming the parts of my improved repair device instead of iron castings to obtain the greater strength and at the same time avoid the disadvantage of rough surfaces which the use of steel castings would otherwise present. I do not, however, limit my invention to steel castings as my improved repair device may be made from cast iron, malleable cast iron or wrought metal, if desired.

Referring to the drawing in which I have illustrated one embodiment of my invention selected for purposes of illustration, I have shown a repair device comprising a split sleeve having its main body of substantially spherical form and, in this instance, formed in two sections separated longitudinally of the sleeve, although I do not limit my invention to a sleeve composed of two sections as it may be formed in a greater number of sections divided longitudinally and bolted together as hereinafter described, if it is found desirable to do so.

As shown in the drawing, each sleeve section is provided with the substantially hemispherical body portion 1, provided at each end with a semi-circular pipe engaging portion, 2, forming with the corresponding portions of the other section the pipe apertures of the sleeve, each section being provided at its opposite edges with a curved face, 3, adapted to meet the opposing corresponding faces of the other section, and with the outwardly extending flanges, 4, provided with means, in this instance, bolt holes, 5, for receiving clamping devices, in this instance the bolts, 6, and nuts, 7, for securing the sections of the sleeve together. As the faces, 3, 3, of each section are substantially in the same plane it is obvious that they can be readily faced by means of a suitable machine, and I prefer to provide the meeting faces of the said sections with interlocking packing engaging portions, in this instance, the faces of one section being provided with a packing recess, 8, while the opposed faces are provided with a packing engaging rib or bead, 9. The interlocking portions of each section, as the grooves, 8, or the ribs, 9, as the case may be, are in a true curve throughout their entire length, as shown, said curves being substantially concentric with the spherical portion of the sleeve and they can, therefore, be readily machined on a lathe or other suitable tool so as to accurately fit each other and interlock when the two sections of the split sleeve are brought together. I prefer to cast the said interlocking devices in order to save machine work and to machine the same, if necessary as for example where the castings are made out of steel, or I may form the interlocking packing engaging portions entirely by the use of machine tools, if preferred.

It is to be noted that the packing engaging portions on the meeting faces of the sleeve sections extend from one end of the sleeve body to the other and terminate just outside of the curved pipe engaging portions, 2, 2, where the sleeve sections are provided with recessed portions, 10, forming an annular packing recess at each end of the sleeve when the two sections are placed together, for the reception of annular packings or packing rings, 11, which are adapted to directly engage the ends of packing strips, 12, interposed between the packing engaging portions of the sleeve sections, and in this instance, lying within the grooves, 8, thereof so that the said annular packings, 11, will make a tight joint between the sleeve sections and the pipe, and between the sleeve sections and the end portions of the packing strips, 12.

The sleeve sections are provided at each end with semicircular exterior flange portions, 13, 13, provided in this instance with bolt holes to receive clamping bolts, 14, provided with nuts, 15, for drawing the followers toward the sleeve to compress the packings, 11. For the purpose of reinforcing the said flanges, 13, braces or webs, 16, are preferably provided on either side of each bolt hole, and the adjacent portion of the wall of the sleeve section is also thickened as indicated at 17 between said braces.

The followers may be of any preferred form and ordinarily comprise an exterior annular plate portion, 18, provided with bolt holes to receive the bolts, 14, and an annular flange portion, 19, which extends into the end recess of the sleeve and into engagement with the packing, 11, as clearly indicated in Fig. 2, for the purpose of compressing said packing. I prefer to form the followers in at least two parts or sections as indicated in Fig. 4, in which one of said followers is shown formed in two sections, and provided with meeting lugs, 20, connected by clamping bolts, 21, and nuts, 22, and I prefer to have the plane of separation between the sections of the followers perpendicular to the plane of separation between the sections of the split sleeve, as indicated in that figure.

Where these devices are used to repair pipe lines in which a very high pressure is maintained and where the fluid under pressure is escaping as is usually the case, as the repair device is being applied, it is desirable to relieve the pressure within the split sleeve until it has been applied to the pipe, and the followers have been forced in so as to make the joint tight, and for this purpose I prefer to provide the split sleeve with a vent aperture indicated at, 25, and with a valve for closing said aperture, which may be maintained in open position until after the sleeve is completely installed on the pipe line. In this instance I have shown the split sleeve section containing the vent aperture, 25, provided with a valve seat, 26, surrounding the same on the inside of the sleeve and with bosses, 27, adjacent thereto on the inner face of the sleeve section, and I have also shown a valve, 28, provided with an annular recess containing a washer or packing ring, 29, adapted to engage the valve seat, 26, the said valve being provided with laterally projecting lugs, 30, (see Fig. 2), which can be made to engage the bosses, 27, by rotating the valve. The valve is held in position by the screw, 31, engaging the supporting plate or washer, 32, on the exterior of the sleeve section and extending into a threaded portion of the valve.

In applying my improved repair device, it is customary to set the valve, 28, with its lugs in engagement with the bosses, 27, and to screw up the screw, 31, tightly to hold the valve in this position, so as to permit the escape of fluid under pressure in the pipe line through the vent opening, 25, while the sleeve is being placed in position. The sections of the sleeve are then placed around the defective portion of the pipe or the defective coupling in the line, a suitable excavation being made around the pipe line, if the pipe is covered, to enable the workmen to place the sleeve in position. The packing strips, 12, are placed in the packing recesses, 8, of the sleeve section and the meeting faces of the sleeve sections are brought together so that the inter-locking ribs, 9, extend into the recess or grooves, 8, and rest upon the packing strips, 12, and the bolts, 6, and nuts, 7, are placed in position and the nuts turned up to clamp the sleeve sections together upon the packing strips, 12, and make a perfectly tight joint between the same. The annular packings, 11, are then inserted in the end recesses of the sleeve around the pipe or pipes and the followers are placed around the pipe or pipes, the sections thereof being bolted together, and the flanges, 19, shoved into the end recess of the sleeve, when the bolts, 14 and nuts, 15, are placed in position and the nuts turned up so as to force the annular flanges into the end recesses of the sleeve and compress the packings, 11, as before described. After the sleeve has been placed in position and made tight along its edges and at both ends as before described the screw, 31, is loosened slightly and the valve turned so as to disengage the lugs, 30, from the bosses, 27, when the pressure will immediately close the valve and the screw, 31, will be screwed up to secure the valve in closed position.

What I claim and desire to secure by Letters Patent is:

1. In a repair device for stopping leaks in pipe lines, the combination of a split sleeve, provided with an annular packing recess at each end, and comprising a plurality of sections separated longitudinally and having lateral flanges each provided with packing engaging portions arranged in a true curve, concentric with a common point, and extending from one end recessed portion to the other, packings having portions disposed in true curved lines, interposed between the meeting flanges of adjacent sections, clamping devices for connecting the meeting flanges of said sections, annular packings engaging said annular end recesses, followers for engaging said annular packings and means for forcing said followers toward said sleeve.

2. In a repair sleeve for stopping leaks in pipe lines, the combination of a split sleeve provided with an annular packing recess at each end, and comprising two sections separated longitudinally, each section being provided with oppositely extending flanges, provided with curved packing engaging portions both concentric with a common point substantially coincident with the longitudinal axis of the sleeve, curved packing strips interposed between the opposed flanges of said sections and extending to said end recesses, clamping devices for connecting said flanges, annular packings in said end recesses, followers for engaging said annular packings and clamping devices for engaging said followers.

3. In a repair sleeve for stopping leaks in pipe lines, the combination of a split sleeve, provided with an annular packing recess at each end, and comprising two sections separated longitudinally, each section being provided with oppositely extending flanges, having their faces in substantially the same plane, the flanges of said sections being provided with interlocking curved packing engaging portions, the packing engaging portions of the flanges of each section being concentric throughout with a common point substantially in alinement with the longitudinal axis of the sleeve, packings interposed between the flanges of adjacent sections, clamping devices for uniting said flanges, annular packings in said end recesses, followers for said annular packings and clamping devices for said followers.

4. In a repair sleeve for stopping leaks in pipe lines, the combination of a split sleeve having a substantially spherical main body and provided with pipe engaging apertures at opposite ends of said spherical body, and with end portions exterior to said apertures, provided with annular packing recesses, said sleeve being formed of a plurality of sections separated longitudinally, said sections being provided with flanges having their central portions disposed in a true curve substantially concentric with the spherical portions of the sleeve, concentrically curved packings interposed between the meeting flanges of said sections, clamping devices connecting the flanges of adjacent packings, annular packings for said end recesses, followers, and clamping devices for engaging said followers.

5. In a repair sleeve for stopping leaks in pipe lines, the combination of a split sleeve having a substantially spherical main body and provided with pipe engaging apertures at opposite ends of said spherical body, and with end portions exterior to said apertures, provided with annular packing recesses, said sleeve being formed in two sections separated longitudinally of the sleeve, each of said sections being provided at opposite edges with flanges having their inner faces in substantially the same plane, and provided with packing engaging portions, the packing engaging portions of both flanges of each section being throughout their extent substantially concentric with the spherical portions of the sleeve, curved packings concentric with said spherical portions interposed between the opposed flanges of said sections, the concentric portions of said flanges being provided with bolt holes having their axes arranged in a curve substantially concentric with the spherical portions of the sleeve, clamping bolts for connecting said flanges, annular packings for said end recesses, followers for said annular packings, and clamping devices for said followers.

6. In a repair device for stopping leaks in pipe lines, the combination of a split sleeve provided with a central spherical portion having oppositely disposed pipe apertures, and end portions exterior thereto provided with annular packing recesses, said sleeve being formed in two sections separated longitudinally of the sleeve, each section having its opposite edges provided with outwardly extending flanges, having their inner faces in substantially the same plane, the opposed faces of said flanges being provided the one with a curved packing recess and the other with a curved rib, said ribs and recesses being concentric with the spherical portions of the sleeve, throughout their length and extending from one end recess to the other, packing strips located in said recesses, clamping devices engaging said flanges, annular packings for said end recesses, followers for said annular packings and clamping devices for said followers.

7. In a repair device for stopping leaks in pipe lines, a split sleeve formed in sections separated longitudinally of the sleeve, meeting faces of said sections being provided with interlocking rib and groove portions, the said meeting faces and the faces of said rib and groove portions being machined, whereby the opposing portions of said sleeve will meet each other accurately, and may be made tight with a minimum amount of packing.

8. In a repair device for stopping leaks in pipe lines, a split sleeve provided with a central spherical portion, said sleeve being formed in sections separated longitudinally and the meeting faces of said sections being provided with truly curved interlocking ribs and grooves respectively, substantially concentric with the center of the said spherical portion, said meeting faces and the surfaces of said grooves and ribs being accurately machined, whereby said meeting faces may be brought together accurately and made tight with a minimum amount of packing.

In testimony whereof I affix my signature.

JAMES CLARK.